Jan. 14, 1958      R. Y. NEILEY      2,819,613
ULTRASONIC THICKNESS MEASURING DEVICE
Filed June 16, 1955

United States Patent Office 2,819,613
Patented Jan. 14, 1958

2,819,613

ULTRASONIC THICKNESS MEASURING DEVICE

Richard Y. Neiley, Brookfield, Conn., assignor to Sperry Products, Inc., Danbury, Conn., a corporation of New York Application June 16, 1955, Serial No. 515,927

3 Claims. (Cl. 73—67.7)

This invention relates to measuring the thickness of objects by means of ultrasonic vibration waves. Heretofore thickness measurement has been proposed by transmitting ultrasonic waves of varying frequency into the object through one side thereof in order to establish resonance when a frequency whose wave length equalled twice the thickness was reached. This method however required means for periodically generating a range of ultrasonic frequencies, and furthermore, the actual thickness of the object was found to deviate from the theoretical thickness as determined by the resonant frequency.

It is therefore the principal object of this invention to provide an ultrasonic thickness measuring device which operates on a single frequency and is therefore less complicated than the device heretofore proposed and not subject to the deviation between theoretical and actual values.

It is a further object of this invention to provide a device of the type described in which the thickness of the object may be indicated directly without the necessity of calculation.

Further objects and advantages of this invention will become apparent in the following detailed description thereof.

In the accompanying drawings.

Figure 1:
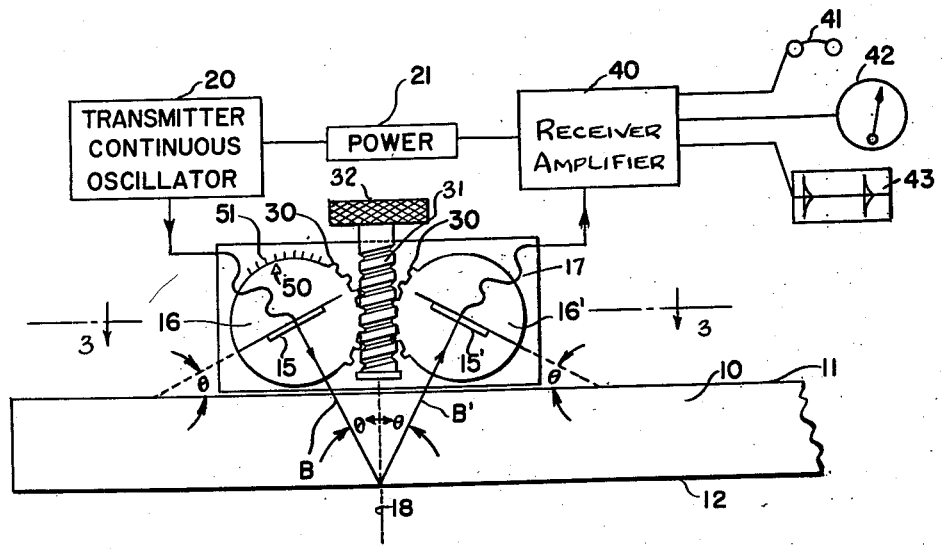
Fig. 1 is a side elevation, partly diagrammatic, of one form of my invention applied to an object whose thickness is to be measured.

Referring to Fig. 1 of the drawings, there is shown an object 10 having opposed surfaces 11 and 12, which object is to be measured for thickness by this invention. For this purpose, there is provided an electroacoustic transducer which may take the form of a quartz crystal 15 mounted in a support 16 which is rotatably mounted in a holder 17 having one face in engagement with surface 11 of object 10. The crystal transmits vibrations through support 16 and holder 17. By rotating support 16 within holder 17, vibrations from the crystal 15 may be caused to enter the object 10 at an angle of incidence $\theta$ to the normal axis 18. For vibrating the crystal 15 continuously at ultrasonic frequency, the crystal may be electrically connected to any suitable continuous oscillator transmitter 20 energized from a power supply 21, so that crystal 15 will be continuously vibrated at a predetermined ultrasonic frequency.

Figure 2:
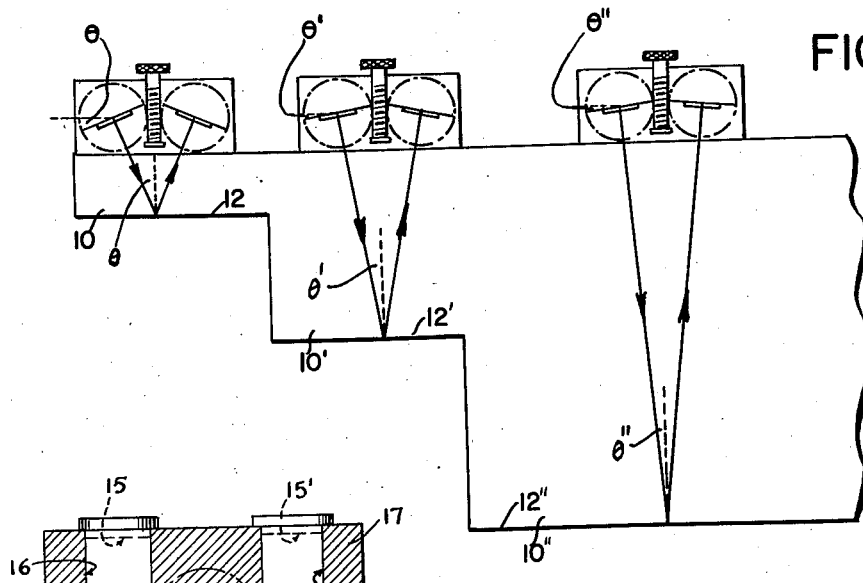
Fig. 2 is a view similar to Fig. 1, with parts omitted, illustrating the theory of operation of the invention.
Figure 3:
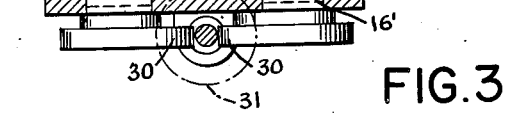
Fig. 3 is a section taken substantially on the line 3—3 of Fig. 1.

The ultrasonic beam B thus transmitted into object 10 through surface 11 at an angle of inclination $\theta$ will strike surface 12 at an angle of incidence $\theta$ and will be reflected from said surface at an equal angle of reflection $\theta$. If a second crystal 15' is mounted in a support 16' similar to support 16 and similarly rotatable in holder 17, and said quartz crystal 15' is inclined at the same angle $\theta$ as the crystal 15 but in the opposite direction, it will be apparent that crystal 15' will receive the maximum amount of reflected energy when it is normal to the reflected beam B'. It will be apparent that if the axes of rotation of supports 16, 16' and their crystals 15, 15' are at equal distances from the axis 18 which is normal to surfaces 11 and 12, crystal 15' will receive maximum energy when the angles of incidence and reflection of the beams B and B' are equal. Therefore, if crystals 15 and 15' are rotated equally and oppositely until maximum energy is received by crystal 15', the angle of inclination of the crystals will be an inverse function of the thickness of the object 10. This is apparent from Fig. 2 wherein it is shown how three separate sections of the object 10, 10', 10'' are measured by the same instrument. The thicker the object, the smaller is the angle of incidence and reflection when the beams B, B' intersect at surfaces 12, 12', 12'', the angles $\theta'$ and $\theta''$ diminishing as the thickness increases. Therefore, the thicker the object, the smaller the angle of movement of the crystals 15 and 15'.

For operating the crystals 15, 15' equally and oppositely, the supports 16, 16' may be provided with spiral threads 30 engaged by a worm gear 31 which may be operated by a knurled knob 32. Thus, by operating knob 32 in one direction or the other, the effective angles of crystals 15 and 15' may be varied equally and oppositely. If desired, thickness of the object may be indicated directly by means of a pointer 50 carried by support 16 or 16' which cooperates with a suitable scale 51 on the holder 17.

While the beams B, B' are shown without refraction on passing through holder 17 and object 10, it will be understood that this condition will exist only where the holder and object are of the same material as supports 16, 16'. Where the materials differ, there will be refraction, but the principle of the invention is unaffected thereby.

For indicating the setting of receiver 15' at the point of maximum received energy, suitable detecting means may be employed. Thus the signal from crystal 15' may be amplified by a receiver amplifier 40 whose output may be detected by earphones 41 or may be indicated on a meter 42 or on the screen of a cathode ray tube 43.

Having described my invention, what I claim and desire to secure by Letters Patent is:

1. A device for determining thickness of an object having opposed surfaces, comprising a transmitting electroacoustic transducer cooperating with one surface of said object for transmitting ultrasonic vibrations into the object through said surface, a source of electrical oscillations of ultrasonic frequency connected to said transducer, a receiving electroacoustic transducer cooperating with said first surface for receiving the vibrations after reflection from the opposite surface of the object, means connected to said receiving transducer for indicating the energy of the received vibrations, and means for rotating the transmitting transducer to vary the angle of incidence of the transmitted vibrations and for simultaneously rotating the receiving transducer equally and oppositely to receive the reflected vibrations, the angle at which maximum energy is received by the receiving transducer being a function of the thickness of the object.

2. A device as specified in claim 1 in which the means for simultaneously rotating the transmitting and receiving transducer comprises a holder, a support for each transducer mounted for rotation in the holder, an operating member mounted in said holder, and gearing between the operating member and the supports, the degree of operation of the operating member being a function of the thickness of the object.

3. A device as specified in claim 2 including an indicator operated by the operating member, the degree of actuation of the indicator by said operating member being a function of the thickness of the object.

References Cited in the file of this patent

UNITED STATES PATENTS 2,660,054    Pringle _____ Nov. 24, 1953

OTHER REFERENCES

Publication-Microtecnic, vol. 8, No. 21, 1954, Lausanne (Switzerland), article on pp. 84–88 by Pohlman.